Feb. 19, 1935.  P. RILEY  1,991,911
SUSPENSION MEANS FOR MOTOR VEHICLES
Filed May 24, 1934  6 Sheets-Sheet 1

Inventor
Percy Riley
by Mawhinney & Mawhinney
Attorneys.

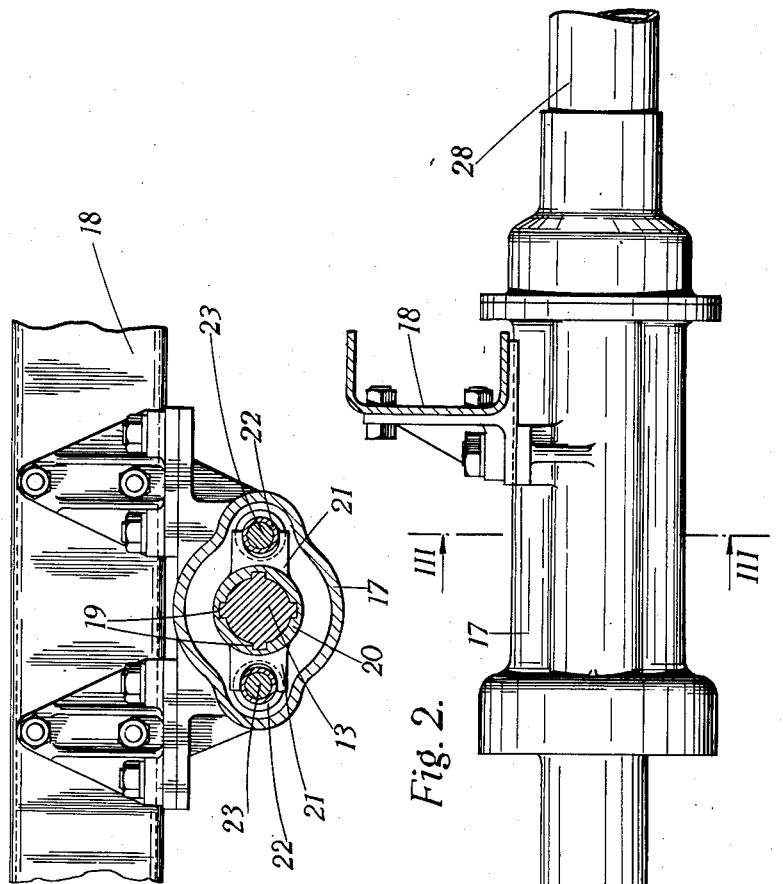
Fig. 3. Fig. 2.
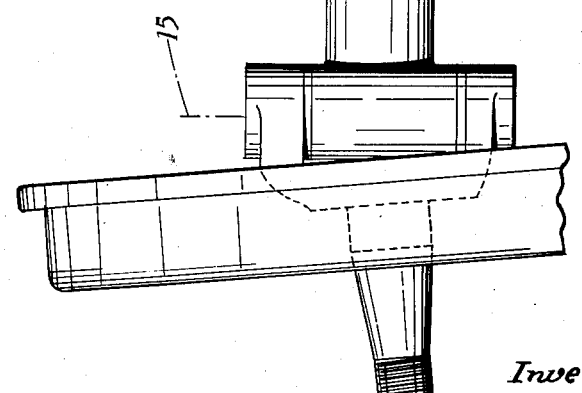

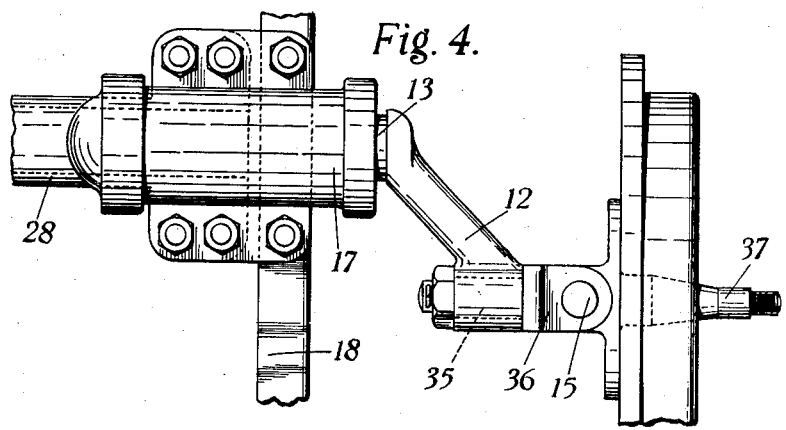
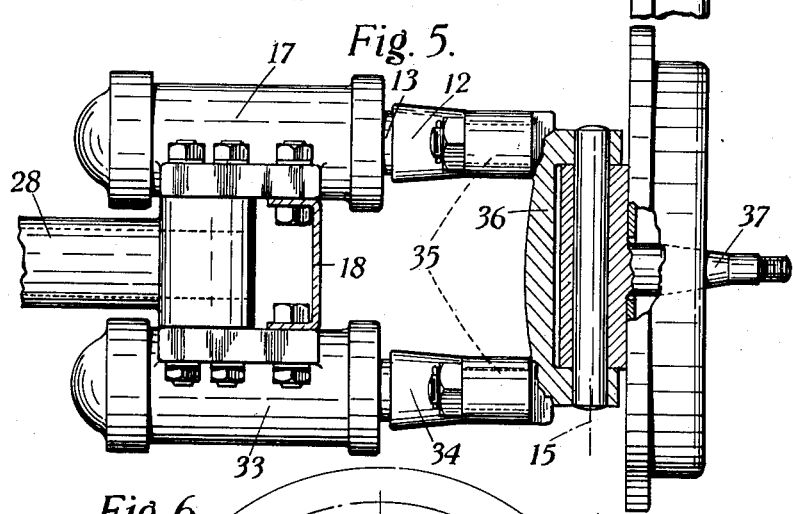
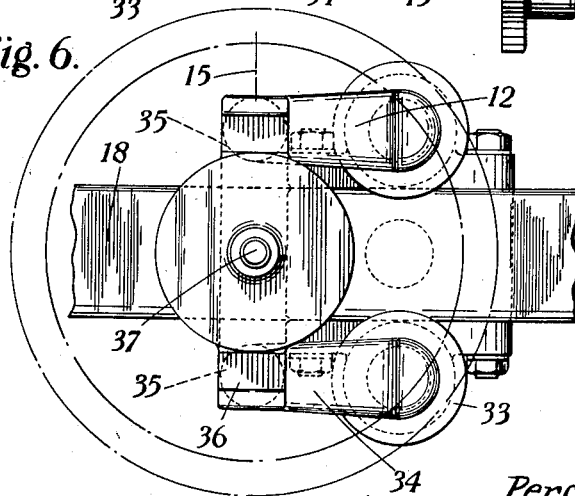

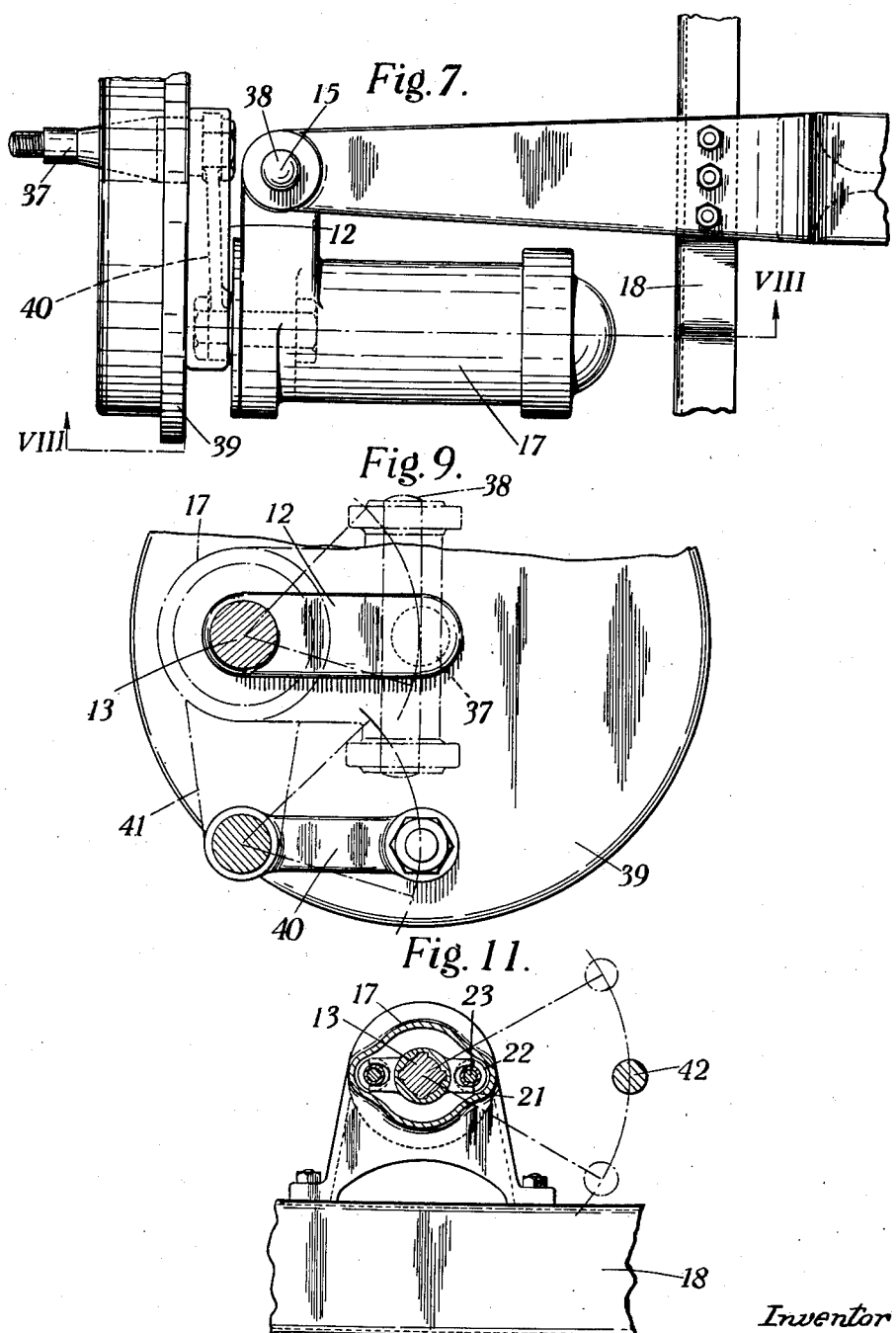

Feb. 19, 1935.   P. RILEY   1,991,911
SUSPENSION MEANS FOR MOTOR VEHICLES
Filed May 24, 1934   6 Sheets-Sheet 5

Inventor
Percy Riley
by Mawhinney & Mawhinney
Attorneys.

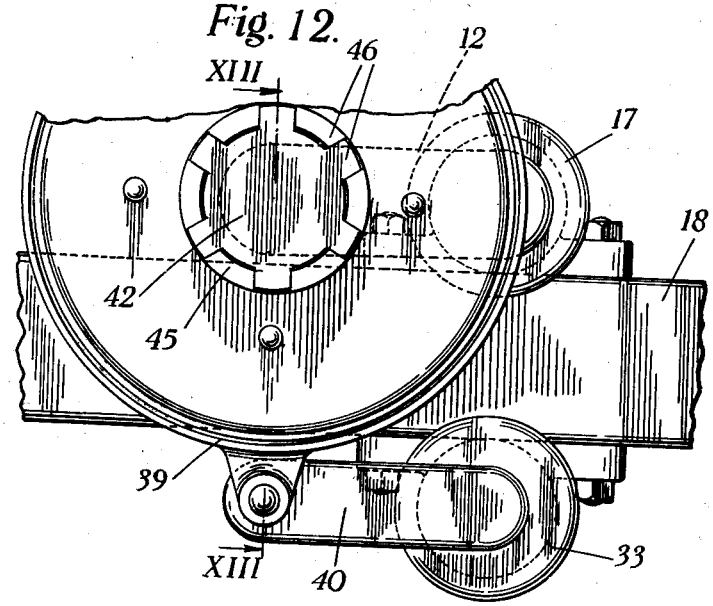
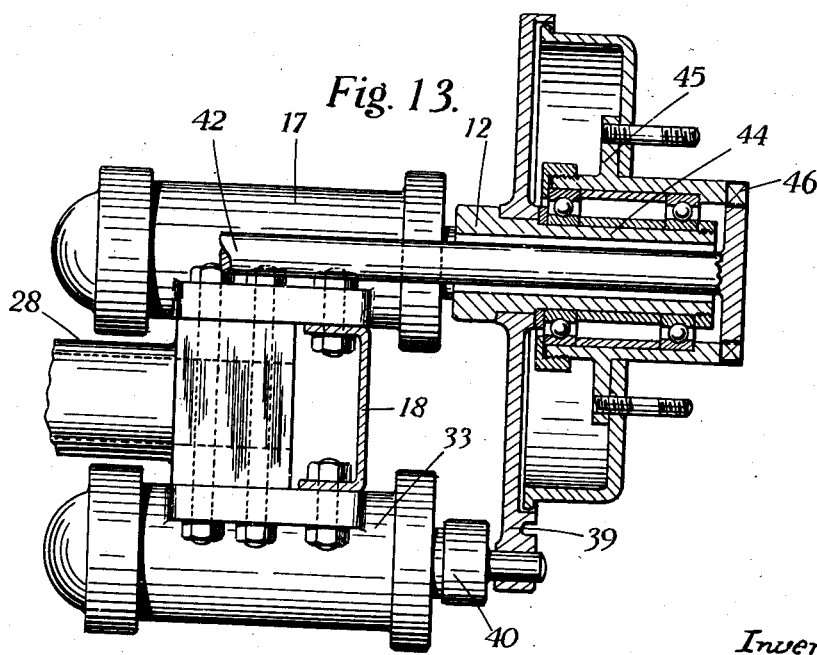

Patented Feb. 19, 1935

1,991,911

UNITED STATES PATENT OFFICE 1,991,911

SUSPENSION MEANS FOR MOTOR-VEHICLES

Percy Riley, Coventry, England

Application May 24, 1934, Serial No. 727,361
In Great Britain May 3, 1933

4 Claims. (Cl. 267—20)

This invention relates to suspension systems for motor-vehicles, of the kind where a road wheel is mounted on a crank, or a steerable portion thereof, which is rotatable about a horizontal transverse axis against spring resistance, the crank lying more or less horizontally.

The main object of the invention is to provide an improved arrangement of the springs in a suspension system of this kind.

According to the present invention, the crank has a screw-threaded or equivalent connection about its rotational axis with a non-rotatable member slidably mounted with respect to a support for the crank for movement against resilient means forming the spring suspension.

In the accompanying drawings:—

Figure 2 is a front elevation thereof and

Figure 3 a cross-section taken on the line III—III of Figure 2;

Figure 4 is a plan of another form of springing for a steerable wheel of a motor-car;

Figure 5 is a part-sectional elevation thereof and

Figure 8:
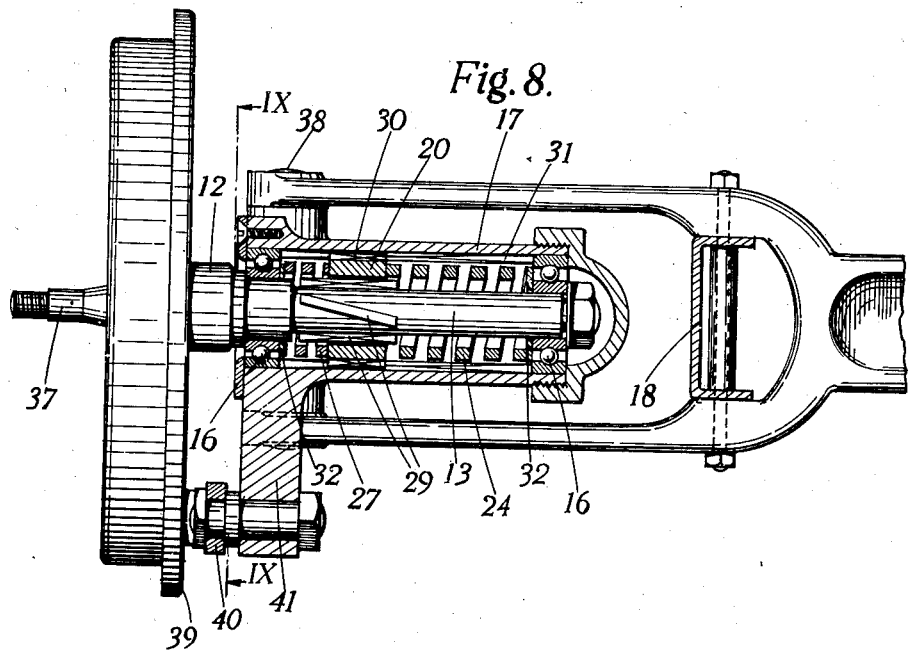
Figure 10:
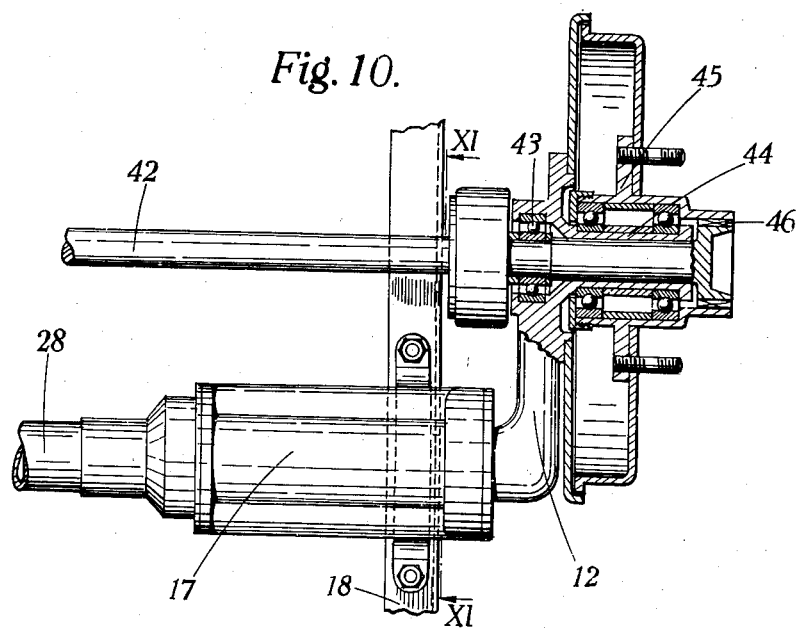

Figure 6 an end view with the brake drum omitted;

Figure 7 is a plan of a further springing arrangement, for a steerable wheel;

Figure 8 is a part-sectional elevation taken on the line VIII—VIII of Figure 7 and Figure 9 is an end view taken on the line IX—IX of Figure 8;

Figure 10 is a part-sectional plan of a springing arrangement, for a non-steerable wheel;

Figure 11 is an end view taken on the line XI—XI of Figure 10; and

Figure 12 is an end view and

Figure 13 a part-sectional elevation taken on the line XIII—XIII of Figure 12 of another arrangement.

Like numerals indicate like parts throughout the drawings.

Figure 1:
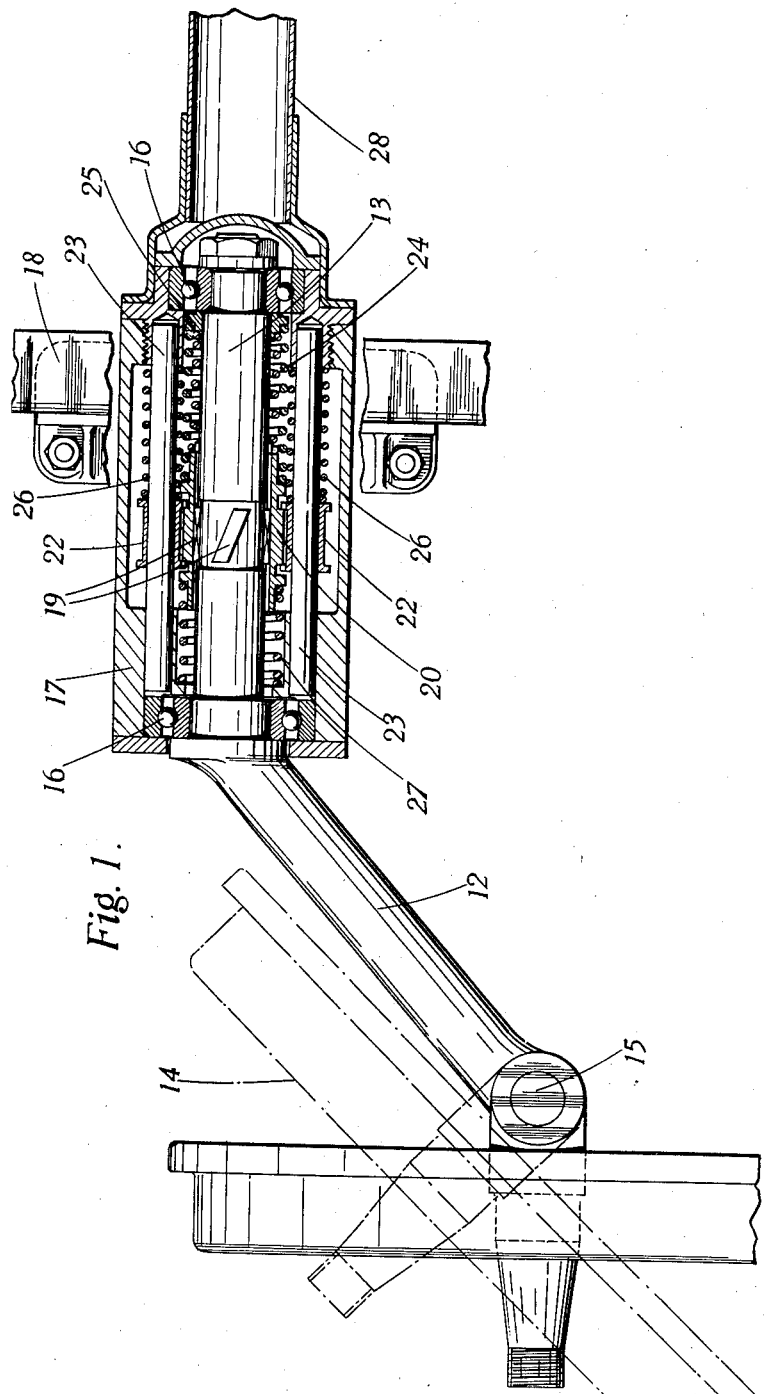
Figure 1 is a sectional plan of one form of springing, according to the invention, for a steerable wheel of a motor-car.

In the construction of Figures 1 to 3, the crank 12 is arranged to trail, and it is inclined at an angle of more than 90 degrees to its spindle 13 to accommodate the steering movements (indicated by the chain lines 14) of the road wheel, the steering axis 15 being through the free end of the crank. The crank spindle is journalled at its ends in anti-friction bearings 16, 16 in a supporting casing 17 which, as a matter of convenience, is built up of a barrel and end plates. This casing is carried fast on the vehicle frame 18.

The spindle is provided on its periphery and more or less centrally with a number of helically-arranged keys 19, 19 which engage corresponding internal slots in a nut 20 mounted for slidable movement in the casing 17 but held against rotation. One method of mounting it consists in forming it with diametrically-opposite forked parts 21, 21 each engaged in peripheral grooves upon bushes 22 which, in turn, are slidable along two bars 23 fast in the casing and parallel to the crank spindle.

In ordinary conditions the crank lies in a more or less horizontal plane. When the road wheel rises relatively to the frame the twisting of the crank spindle, through its threaded engagement with the nut, actuates this latter axially in one direction against a relatively long but strong spring or springs 24 disposed co-axially around the crank spindle, the spring or springs acting between the adjacent end of the nut and a stop plate 25 at the other end. These springs may be subject purely to compression; or, if desired, the stop plate can be anchored on the crank spindle so that the springs would be subjected to torsion as well as to compression. If any further springing effect is needed this may be obtained by compression springs 26 co-axial with the guiding bars 23. On the other side of the nut is a strong short recoil spring 27 co-axial with the crank spindle, this spring being compressed when the road wheel falls relatively to the frame, in which case the nut is actuated in the other direction.

The casings 17 for the two front wheels are conveniently mounted on the end of or united by a transverse tube 28 acting to stiffen the frame.

In the modification of Figure 8, the spindle 13 is formed between the two ball bearings 16, 16 with a multi-start quick-thread portion 29 on its periphery on which works the nut 20 having one or more lugs 30 engaged in longitudinal internal recesses 31 of the casing 17. The main and recoil springs 24, 27, are arranged on opposite sides of the nut to bear against packings 32 disposed near the two ball bearings, respectively.

In the modification of Figures 4 to 6 the support 17 for the crank spindle 13, which may be arranged as shown in Figures 1 to 3 or as shown in Figure 8, is mounted directly upon and above the adjacent chassis longitudinal 18, and secured to the underside of the latter in the same vertical plane is a further support 33 providing a journal bearing for a similar and parallel crank 34. At their free ends the cranks 12, 34 carry transverse horizontal pins 35, 35 with their axes in a vertical plane, the pins being carried by a support 36 for the stub axle 37 of the road wheel.

The lower crank 34 may be connected with its support 33 beneath the chassis longitudinal 18 in the manner of the upper crank 12, to provide some of the spring suspension; or, alternatively, it may be adapted as a shock-absorber. Alternatively, it may be replaced by a plain hinged arm, parallel to the upper crank, similar to the arm 40 of Figures 7 to 9.

In a modification of this arrangement, not illustrated, the stub axle 37 may be supported directly from the free ends of the two cranks 12, 34 (or the crank 12 and the hinged arm) through ball-and-socket means which serve for taking both the steering and the springing movements.

In the modification of Figures 7, 8 and 9, in which only one crank 12 is used, the support 17 therefor is steered as a whole. The steering axis 15 preferably passes to one side of the support instead of through it, the whole swinging about or with the pin 38 on a transverse member of the chassis frame which is forked as shown in Figure 8. The brake anchor plate 39 is shown as being hinged to an arm 40 hinged to a depending bracket 41 rigid with the support 17, this means serving for taking the reaction of the brake. This arm 40 is at all times parallel to the crank 12, and may be adapted to form part of a shock-absorber. The stub axle 37 is in this case integral with the crank.

As regards a rear driving or non-steerable wheel, substantially the same constructions can be adopted as those previously described, except that here each crank 12 can be at right-angles to its journalled spindle, as in Figures 7 to 9. The differential mechanism may be supported directly from the frame and connected to drive the rear wheels through shafts universally jointed adjacent the wheels and adjacent the differential mechanism. The cranks 12 in this case can conveniently be leading.

In the non-steering wheel arrangement of Figures 10 and 11, there is but a single crank 12, upon the lines of the construction of Figures 1 to 3. The driven shaft 42 is journalled at 43 in the free end of the crank 12 formed with a tubular part 44 on which the wheel hub 45 is journalled, the wheel hub having a driving connection at 46 with the shaft 42.

The arrangement of Figures 12 and 13 is somewhat similar to the last except that, in addition, an arm 40 is journalled in the support 33 for movement about a transverse horizontal axis in the vertical plane through the rotational axis of the crank 12. The free end of the arm is hinged to the brake anchor plate 39, and thus serves for taking the braking reactions. If desired it may also be adapted as a crank (such as the crank 34 of Figures 4, 5 and 6) as previously described to provide some of the springing or for shock-absorbing purposes.

With the arrangements of independent wheel springing above described, body roll is prevented and a high degree of riding comfort is obtained. By the use of a screw-threaded or equivalent connection between the crank spindles and the nuts any desired degree of friction can be introduced, though preferably the connections would be the equivalent of very quick threads.

What I claim as my invention and desire to secure by Letters Patent of the United States is:—

1. A suspension means for a motor vehicle and the brake anchor plate comprising a substantially horizontally disposed crank, a crank shaft secured at one end to an end of the crank and disposed on an angle relative to the crank, a spindle secured to the other end of the crank on an axis at right angles to the length of the crank, a supporting housing in which said shaft is rotatable, a slide member in the housing and about said shaft, coacting means carried by the shaft and the slide to effect longitudinal movement of the slide upon rotation of the shaft, means engaging on each side of the slide resisting longitudinal movement of the slide in either direction, said means maintaining said crank in a normal substantially horizontal position, means for pivotally securing the housing to a fixed portion of the vehicle whereby said housing may swing in a horizontal plane, and means connecting the anchor plate with the housing for holding the anchor plate against turning movement.

2. A suspension means for a motor vehicle and the brake anchor plate comprising a substantially horizontally disposed crank, a crank shaft secured at one end to an end of the crank and disposed on an angle relative to the crank, a stub shaft secured to the other end of the crank on an axis at right angles to the length of the crank, a supporting housing in which said shaft is rotatable, a sleeve loosely mounted on the shaft, means for effecting longitudinal movement of the sleeve upon rotation of the shaft, means for holding the sleeve against turning, means engaging on each side of the sleeve resisting longitudinal movement of the sleeve in either direction, means for pivotally securing the housing to a fixed portion of the vehicle whereby said housing may swing in a horizontal plane, and means connecting the anchor plate with the housing for holding the anchor plate against turning movement.

3. A suspension means for a motor vehicle and the brake anchor plate comprising a substantially horizontally disposed crank, a crank shaft secured at one end to an end of the crank and disposed on an angle relative to the crank, a stub shaft secured to the other end of the crank on an axis at right angles to the length of the crank, a supporting housing in which said shaft is rotatable, a sleeve loosely mounted on the shaft, means for effecting longitudinal movement of the sleeve upon rotation of the shaft, means for holding the sleeve against turning, means engaging on each side of the sleeve resisting longitudinal movement of the sleeve in either direction, said latter means including unbalanced pressure means on one side of the sleeve acting to maintain said crank substantially horizontal when in applied position, means for pivotally securing the housing to a fixed portion of the vehicle whereby said housing may swing in a horizontal plane, and means connecting the anchor plate with the housing for holding the anchor plate against turning movement.

4. A suspension means for a motor vehicle and the brake anchor plate comprising a substantially horizontally disposed crank, a crank shaft secured at one end to an end of the crank and disposed on an angle relative to the crank, a stub shaft secured to the other end of the crank on an axis at right angles to the length of the crank, a housing in which said shaft is rotatable, means for securing said housing to the frame of the vehicle, a sleeve loosely mounted on the shaft, thread means carried by the shaft the sleeve to effect longitudinal movement of the sleeve upon partial rotation of the shaft, means for holding the sleeve against turning while permitting longitudinal movement thereof, a pressure means in the housing engaging against one end of the sleeve to constantly urge the sleeve to move in one direction, a second pressure means in the housing engaging against the other end of the sleeve and having a greater tension than the first pressure means whereby to maintain said crank in substantially horizontal position when in applied position, means for pivotally securing the housing to a fixed portion of the vehicle whereby said housing may swing in a horizontal plane, and means connecting the anchor plate with the housing for holding the anchor plate against turning movement.

PERCY RILEY.